US010960793B2

United States Patent
Gandhi et al.

(10) Patent No.: US 10,960,793 B2
(45) Date of Patent: Mar. 30, 2021

(54) ACTIVE VEHICLE SEAT WITH MORPHING PORTIONS

(71) Applicants: Toyota Motor Engineering & Manufacturing North America, Inc., Plano, TX (US); Miga Technologies, LLC, Silverton, OR (US)

(72) Inventors: Umesh N. Gandhi, Farmington Hills, MI (US); Brian J. Pinkelman, Ann Arbor, MI (US); Ryohei Tsuruta, Ann Arbor, MI (US); Mark A. Gummin, Silverton, OR (US)

(73) Assignees: Toyota Motor Engineering & Manufacturing North America, Inc., Plano, TX (US); Miga Technologies, LLC, Silverton, OR (US)

( * ) Notice: Subject to any disclaimer, the term of this patent is extended or adjusted under 35 U.S.C. 154(b) by 81 days.

(21) Appl. No.: 16/293,997

(22) Filed: Mar. 6, 2019

(65) Prior Publication Data

US 2020/0282878 A1    Sep. 10, 2020

(51) Int. Cl.
*B60N 2/42*        (2006.01)
*B60N 2/427*        (2006.01)
(Continued)

(52) U.S. Cl.
CPC ....... *B60N 2/42727* (2013.01); *B60N 2/4279* (2013.01); *B60N 2/986* (2018.02);
(Continued)

(58) Field of Classification Search
CPC .. B60N 2/42727; B60N 2/4279; B60N 2/986; B60N 2002/026; F16C 2202/28
See application file for complete search history.

(56) References Cited

U.S. PATENT DOCUMENTS 7,125,077 B2    10/2006  Frank
7,237,847 B2    7/2007   Hancock et al.
(Continued)

FOREIGN PATENT DOCUMENTS

CN    108819806 A    11/2018
KR    20050056526 A    6/2005
(Continued)

OTHER PUBLICATIONS

U.S. Appl. No. 16/367,457, filed Mar. 28, 2019.

*Primary Examiner* — Lori L Lyjak
(74) *Attorney, Agent, or Firm* — Christopher G. Darrow; Darrow Mustafa PC

(57) ABSTRACT

Actuators can be used in controlling a seat surface of a vehicle seat. The actuators can have an outer skin in connection with a hinge assemblies. The actuators can include a shape-memory material (SMM) member operatively connected to the hinge assemblies. The SMM member can be a shape-memory alloy (SMA) wire. The SMM member can change from a first configuration to the second configuration in response to an activation input, such as heat. The input can be delivered to the SMM member upon detecting an activation condition, such as detection of lateral acceleration. The actuators are operatively positioned relative to a seat surface such that, when the SMM member changes configuration, actuator causes the seat surface to morph.

20 Claims, 7 Drawing Sheets

(51) Int. Cl.
*B60N 2/02* (2006.01)
*B60N 2/90* (2018.01)

(52) U.S. Cl.
CPC .. *B60N 2002/026* (2013.01); *B60N 2002/924* (2018.02); *F16C 2202/28* (2013.01)

(56) References Cited

U.S. PATENT DOCUMENTS

| | | |
|---|---|---|
| 7,484,735 B2 | 2/2009 | Verbrugge et al. |
| 7,892,630 B1 | 2/2011 | McKnight et al. |
| 7,901,524 B1 | 3/2011 | McKnight et al. |
| 7,905,538 B2 | 3/2011 | Ukpai et al. |
| 7,909,403 B2 | 3/2011 | Lawall et al. |
| 8,240,677 B2 | 8/2012 | Browne et al. |
| 10,059,334 B1 | 8/2018 | Zhu et al. |
| 10,532,672 B1 | 1/2020 | Pinkelman et al. |
| 2005/0198904 A1 | 9/2005 | Browne et al. |
| 2005/0206096 A1 | 9/2005 | Browne et al. |
| 2006/0038745 A1 | 2/2006 | Naksen et al. |
| 2007/0246898 A1 | 10/2007 | Keefe et al. |
| 2015/0197173 A1 | 7/2015 | Hulway |
| 2015/0202993 A1 | 7/2015 | Mankame et al. |
| 2017/0240075 A1* | 8/2017 | McCoy ................ B60N 2/4221 |
| 2017/0252260 A1 | 9/2017 | Gummin et al. |
| 2020/0223325 A1* | 7/2020 | Pinkelman ........... B60N 2/0224 |
| 2020/0238854 A1 | 7/2020 | Gandhi et al. |
| 2020/0247274 A1 | 8/2020 | Gandhi et al. |
| 2020/0298732 A1 | 9/2020 | Gandhi et al. |

FOREIGN PATENT DOCUMENTS

| | | |
|---|---|---|
| KR | 101395364 B1 | 5/2014 |
| WO | 2017077541 A1 | 5/2017 |

\* cited by examiner

ACTIVE VEHICLE SEAT WITH MORPHING PORTIONS

FIELD

Implementations described herein generally relate to responsive vehicle seats, and, more particularly, to vehicle seats with active seat components that include a shape-memory materials.

BACKGROUND

A person's posture is one or many tangible facets of their overall health. Resting in a vehicle seat for long periods of time, such as during long rides in a vehicle or daily commutes, can make maintaining a healthy posture more challenging. Seat bolsters can maintain a fixed shape to offer lateral support to an occupant. Seat bolsters can have a shape which reduces sliding in the seat, to help maintain a healthy posture while the occupant is seated for long periods. Further, seat bolsters can provide resistance against the leg or torso which provides lateral support to occupants during acceleration or tight turns.

SUMMARY

In one or more implementations, an actuator is disclosed. The actuator can include a first hinge assembly and a second hinge assembly. The actuator can further include an outer skin operatively connected to the first and second hinge assemblies. The outer skin can include one or more material layers. The outer skin can define a cavity. The actuator can further include one or more shape-memory material (SMM) members operatively connected to the first and second hinge assemblies. The SMM member can be located substantially entirely within the cavity. The actuator can further include a first dimension and a second dimension. The first dimension can be substantially perpendicular to the second dimension. The first dimension can be in a direction that extends through the first and second hinge assemblies. The actuator can further be configured such that, when an activation input is provided to the SMM members, the SMM members can change from a first configuration to a second configuration and cause the actuator to morph into an activated configuration in which the first dimension increases or decreases and the second dimension changes inversely to the first dimension.

In further implementations, a system for active vehicle seat adjustment is disclosed. The system can include a vehicle seat, the vehicle seat including a seat surface. The system can further include one or more actuators located within a portion of the vehicle seat, the one or more actuators being operatively positioned relative to the seat surface. The actuators can include one or more hinge assemblies. The actuators can further include an outer skin operatively connected to the one or more hinge assemblies, the outer skin comprising one or more material layers configured to define a cavity. The actuators can further include a SMM wire operatively connected to the outer skin and at least one of the one or more hinge assemblies, the SMM wire being positioned within cavity. The actuator can further include a first dimension and a second dimension. The first dimension can be substantially perpendicular to the second dimension, the first dimension being in a direction that extends through the one or more hinge assemblies. The actuator can further be configured such that, when an activation input is provided to the SMM wire, the SMM wire changes from a first shape to a second shape and causes the actuator to morph into an activated configuration in which the first dimension increases or decreases and the second dimension changes inversely to the first dimension.

In further implementations, a method of morphing a portion of a vehicle seat is disclosed. One or more actuators can be located within the vehicle seat. The one or more actuators can be operatively positioned such that, when activated, the one or more actuators cause a portion of the seat to morph into an activated configuration. The method can include determining, based on the sensor data acquired by one or more sensors, whether a seat actuator activation condition is met. The method can include, responsive to determining that the seat actuator activation condition is met, causing one or more actuators to be activated to cause a portion of the vehicle seat to morph into an activated configuration. The one or more actuators can include a first hinge assembly and a second hinge assembly. The one or more actuators can include an outer skin operatively connected to the first hinge assembly and the second hinge assembly. The outer skin can include one or more material layers. The outer skin can define a cavity. The one or more actuators can include a shape-memory material (SMM) member operatively connected to the first hinge assembly and the second hinge assembly. The SMM member can be located substantially within the cavity.

In further implementations, a flexible actuator configured to operatively connect to a seat surface is disclosed. The flexible actuator can include an outer skin for transmitting a force to at least a portion of the seat surface. The surface material can include an upper interior surface and a lower interior surface operatively connecting at one or more interfacing regions. The surface material can further include an exterior surface for operatively connecting with the seat bolster. The flexible actuator can further include one or more hinge assemblies connected with one of the one or more interfacing regions. Each of the hinge assemblies can include a first attachment member and a second attachment member connected by a hinge joint. The first attachment member can rotate with relation to the second attachment member about the hinge joint. The flexible actuator can further include a SMM wire for changing configuration in response to an input. The SMM wire can have a first configuration in the absence of the input and a second configuration in the presence of the input. The SMM wire can act upon at least one of the one or more hinge assemblies to change the shape of the seat surface. The flexible actuator can further include an input element operatively connected with the SMM wire. The input element can be configured to deliver the input to the SMM wire in response to a stimulus. The flexible actuator can further include two attachment points for connecting the SMM wire with the surface material and the hinge assembly. The attachment points can transfer force from the input-responsive material to the flexible surface material.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate exemplary implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

Figure 1A:
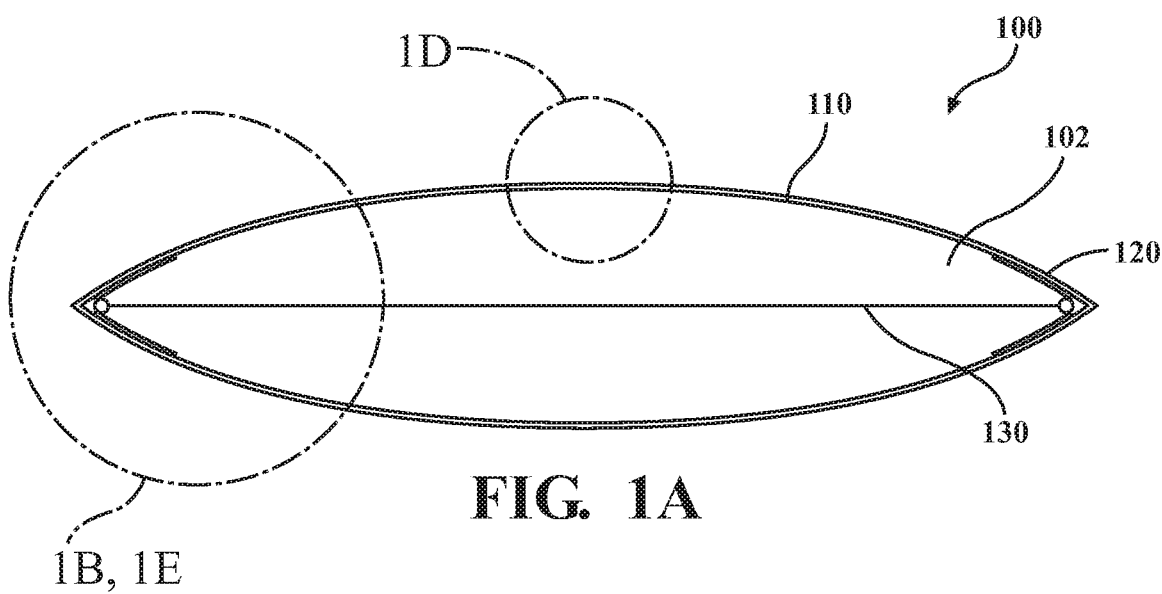
FIG. 1A-1E are illustrations of actuators, according to implementations described herein.

Systems and devices described herein relate to actuators that include shape-memory material (SMM) members and seat assemblies which employ such actuators to control the shape and/or position of the seat surface. The SMM members can be SMM wires. SMM wires, as used herein, are wires which include a SMM, such as a wire which is composed of a SMM material. SMMs are a composition which undergoes a reversible transformation in response to a change in temperature or other input.

SMMs can generally include shape-memory alloys (SMA) and shape-memory polymers (SMP). SMAs undergo a thermo-elastic phase transformation in passing from a one phase (e.g., a martensitic phase) to another phase (e.g., an austenitic phase) when heated to a temperature above the phase change transition temperature. Below the phase change transition temperature, the alloy can be readily plastically deformed by as much as a few percent. The SMA remains deformed until heated to or above the phase change transition temperature, at which point the SMA reverts to its original or memory shape. Some SMAs have a resistivity which can be employed for direct heating (e.g., resistive heating by an electric current). As used herein, the phrase "heated to or above the phase change transition temperature" refers to both heating the alloy to a temperature within the phase change transition temperature range or above this range.

The SMM wires are connected to one or more hinge assemblies. The one or more hinge assemblies can connect the SMM wires to an outer skin. As the SMM wires change configuration, the SMM wires exert a force on the hinge assemblies, such as by pulling the same hinge assembly at two different points or by pulling a hinge assembly inward. This force is translated through the hinge assemblies to the outer skin, causing the outer skin to increase or decrease in a first dimension. The change in the first dimension can be inverse to the change in the second dimension of the outer skin. It will be understood that that term "inverse" includes proportional changes as well as non-proportional changes. The outer skin can be operatively positioned with respect to the seat surface of the vehicle seat. Thus, the change in dimensions of the outer skin can be translated to the seat surface of the vehicle seat. Through this translation of force, the resulting action created by the SMM wires leads to a change in shape at the seat surface of the vehicle seat.

The SMM wires can be controlled as part of the system, such as an actuator control system. The actuator control system can receive data, such as sensor data, related to the vehicle and/or the movement of the vehicle affecting the position of the occupants. In one or more implementations, this data can be referred to as a stimulus. As the vehicle moves from one location to another, the movements of the vehicle can be translated to occupants of the vehicle as lateral acceleration. As such, occupants of the vehicle may be jostled or otherwise displaced from the vehicle seat within the cabin of the vehicle. The data received by the actuator control system can be analyzed to determine if the occupant(s) have been displaced or if the occupant(s) will be displaced due to movements of the vehicle. The data can be derived, received, or obtained from one or more sources, such as one or more sensors and/or one or more vehicle systems. The one or more sensors can be positioned or located such that they can detect movement of the vehicle, such as one or more sensors disposed on or in the vehicle.

Once the actuator control system determines that the occupant(s) have been or will be displaced from the vehicle seat, the actuator control system can deliver an input to at least one of the one or more actuators. The actuators can receive the input and apply the input to the SMM wires, such that the SMM wires change in configuration from the first configuration to the second configuration. The input received can be directly delivered to the SMM wires of the actuator (e.g., through heating element or by passing an electrical current to the SMM wires). In further implementations, the input can be received by the actuator as instructions for the actuator to control the SMM wires independently (e.g., a computing device which receives the input and produces a control input for the SMM wires in response).

Among other things, the devices and systems described herein can improve seating comfort, as well as occupant safety. The systems and devices can automatically adjust an occupant support component to a high-support state when needed or desired. For example, when used in a vehicle seat, the present technology can be automated for use during turns, accelerations, periods of high g-forces, or other events where an occupant may benefit from temporary increased lateral support and/or increased firmness of the occupant support component. The use of SMM wires coupled to a hinge provides a light-weight, low-cost approach to adjusting a shape, contour, or position of components, such as occupant support components. This minimizes or removes the requirement for the use of various motors, which minimizes opportunities for mechanical failure. Implementations of the present application can be more clearly understood with relation to the figures and the description below.

FIGS. 1A-1E are illustrations of exemplary actuators 100, according to some implementations. The actuator(s) 100 described herein can be used as part of a system for active adjustment of one or more portions of a vehicle seat, such as an actuator control system. The actuator(s) 100 can be flexible. The actuator(s) 100 can include an outer skin 110, and hinge assemblies 120, and input-responsive element 130. The actuator(s) 100 through outer skin 110 can be configured to receive a change in position of the hinge assemblies 120, as created by the input-responsive element 130. The change in shape of the input-responsive element 130, as translated by the outer skin 110, can change the shape of one or more components of the vehicle seat, such as the seat surface. Thus, the actuator(s) 100 can change the shape vehicle seat in response to a stimulus to respond to forces applied to the occupants in the vehicle.

Figure 1B:
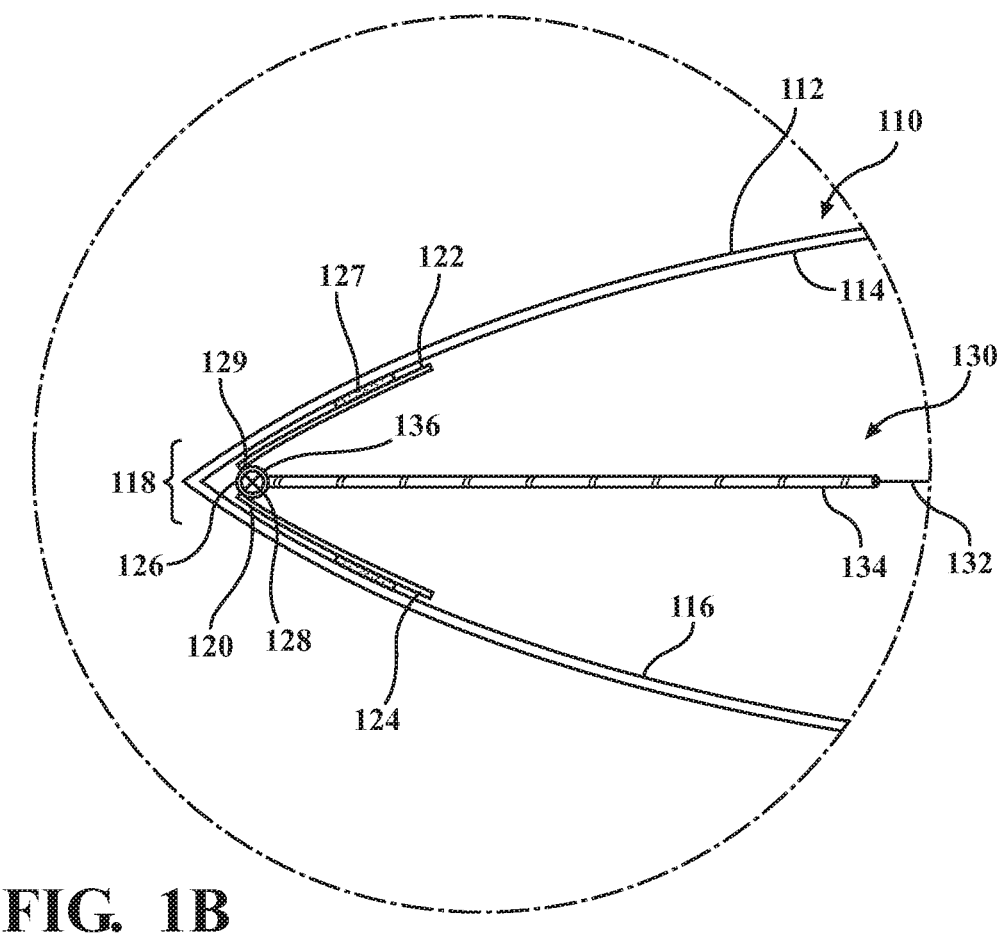

FIG. 1A is a side view of an illustration of the actuator(s) 100, according to some implementations described herein. FIG. 1B is an exploded view of a portion of the illustration of the actuator(s) 100, as shown in FIG. 1A. The actuator(s) 100 is depicted here with the outer skin 110, the hinge assemblies 120, and the input-responsive element 130 in a passive configuration. "Passive configuration," as used herein, relates to a state or position of the actuator when at rest or otherwise not receiving an input.

The exterior of the actuator(s) 100 can substantially comprise the outer skin 110. The outer skin 110 can define the general shape of the actuator(s) 100. The outer skin 110 can be formed from a single piece and/or multiple pieces of one or more materials, such as two (2) or more sheets of a material. Further, the outer skin 110 need not be composed of a uniform material. As such, the outer skin 110 can include one or more materials within a single sheet, one or more materials among multiple sheets, or combinations thereof. FIG. 1D shows an example in which the outer skin 110 includes more than one layer (e.g., a first layer 110' and a second layer 110").

The outer skin 110 can have an exterior surface 112. The exterior surface 112 can form the outermost facing surface of the actuator(s) 100. The outer skin 110 can further include an upper interior surface 114 and a lower interior surface 116. The upper interior surface 114 and the lower interior surface 116 form an inner surface of the actuator(s) 100 and define a cavity 102. In some implementations, the outer skin 110 can be joined together at an interfacing region 118, thus forming an enclosed version of the cavity 102. In some implementations, the outer skin 110 can act as a support structure for the actuator(s) 100, thus allowing for the general position of the elements contained therein.

The outer skin 110 can be composed of or include a substantially flexible material. "Flexible" refers to the property of the outer skin 110 that can be reversibly deformed, such that the outer skin 110 will not be damaged during the deformation. Damage can include cracking, breaking, fracturing, or other forms of inelastic deformation. As used herein, the term "substantially" includes exactly the term it modifies and slight variations therefrom. Thus, the term "substantially flexible" means the entirety of the element is flexible and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

In some implementations, the flexible material is a flexible polymer. Specific examples of flexible polymers which can be used various implementations include rubber (including natural rubber, styrene-butadiene, polybutadiene, neoprene, ethylene-propylene, butyl, nitrile, silicone), polycarbonates, acrylic, polyesters, polyethylenes, polypropylenes, nylon, polyvinyl chlorides, polystyrenes, elastomers, polyolefins, and others flexible polymers known to persons skilled in the art. In some implementations, the flexible material can be exposed to a degree of stretch selected in the range of about 1% to about 1300%, such as about 10% to about 1300%, or about 100% to about 1300% without resulting in mechanical failure (e.g., tearing, cracking, or inelastic deformation). In further implementations, the flexible material can be deformed to a radius of curvature selected in the range of 100 micrometers ($\mu$m) to 3 meters (m) without mechanical failure.

The actuator(s) 100 can further include one or more hinge assemblies 120. The hinge assemblies 120 can have any suitable configuration. The hinge assemblies 120 can be any suitable type of hinge, now known or later developed. In one or more arrangements, the hinge assemblies 120 can include a first attachment member 122, a second attachment member 124, and a hinge joint 126. In some implementations, the hinge joint 126 can form the center of the hinge assemblies 120. The first attachment member 122 can rotate or otherwise move with relation to the second attachment member 124, such as moving about the hinge joint 126. The first attachment member 122 can be substantially similar to the second attachment member 124, a mirror image of the second attachment member 124 about the hinge joint 126, or others. The first attachment member 122 and the second attachment member 124 can be of any primary shape or combinations of shapes. As well, the first attachment member 122 can include one or more shapes, sizes, or components which are different from the second attachment member 124.

The first attachment member 122 can be operatively connected to the upper interior surface 114 of the actuator(s) 100. Conversely, the second attachment member 124 can be operatively connected to the lower interior surface 116 of the actuator(s) 100. In some implementations, the first attachment member 122 and/or the second attachment member 124 can be directly or indirectly attached to the upper interior surface 114 and/or the lower interior surface 116, respectively. In further implementations, the first attachment member 122 is connected to the upper interior surface 114 via a connection element 127. The connection element 127 can be one or more components which cause the first attachment member 122 to attach to the upper interior surface 114, such as an adhesive(s), fastener(s), and/or mechanical engagement(s).

As used herein, the terms "operatively connected" and/or "operative connection" generally refer to any form of connection or association capable of being formed between two or more elements, in light of the functions and/or operations described in the implementations disclosed herein. In one or more implementations, "operatively connected" can include any form of direct and indirect connections, including connections without direct physical contact. Elements which are described herein as "operatively connected" can, in one or more implementations, be more specifically described as "directly connected", "indirectly connected", "connected", "fluidly connected", "mechanically connected", "electrically connected", "fixably connected", "transiently connected", other forms of connection, or combinations of the above connections, as appropriate for the elements being described. In further implementations, prepositions such as "to," "with," "between," "in parallel," "in series," or combinations thereof, can be added to more clearly describe the organization of the operative connections described herein or exchanged to discuss alternative implementations. Furthermore, "operatively connected" can include unitary physical structures, that is, structures formed from a single piece of material (e.g., by casting, stamping, machining, three-dimensional printing, etc.). All permutations of operative connections described here are expressly contemplated for one or more implementations of this disclosure without further explicit recitation herein.

The first attachment member 122 and the second attachment member 124 can be formed from a material such that the first attachment member 122 and the second attachment member 124 can deform, bend, and/or displace the outer skin 110 in response to an applied force. In some implementations, the first attachment member 122 and/or the second attachment member 124 can be formed from a metallic material, such as, for example, steel, aluminum, brass, or others. In further implementations, the first attachment member 122 and/or the second attachment member 124 can be formed from a rigid or semi-rigid material, such as a plastic (e.g., Acrylonitrile butadiene styrene (ABS)). The first attachment member 122 and/or the second attachment member 124 can be sized, shaped, and/or configured to support the outer skin 110 and/or to apply for a desired level of force.

The hinge joint 126 can provide mobility or flexibility to the first attachment member 122 and the second attachment member 124 with respect to one another. In some implementations, the hinge joint 126 includes a hinge pin 128 positioned within an opening 129. In this implementation, the opening 129 can be shared between the first attachment member 122 and the second attachment member 124 such that the hinge assemblies 120 joins the first attachment member 122 and the second attachment member 124 at the hinge joint 126. It should be understood that the implementation of the hinge joint 126 described here is merely an example of possible implementations. In further implementations, the hinge joint 126 can be any hinge joint capable of allowing movement or rotation of the first attachment member 122 respect to the second attachment member 124 about the hinge joint 126.

The actuator(s) 100 can further include the input-responsive element 130. The input-responsive element 130 includes one or more elements capable of transitioning from a first configuration to a second configuration. The transition of the input-responsive element 130 from the first configuration to the second configuration displaces the hinge assemblies 120 with respect to the outer skin 110 and causes a change in confirmation of the outer skin 110. In some implementations, the input-responsive element 130 can include a SMM wire 132. In some instances, it can also include a heating element 134. Though the heating element 134 is described as surrounding the SMM wire 132, the heating element 134 can have any form of operative connection to the SMM wire 132, such that heat can be delivered. The SMM wire 132 can be configured to increase or decrease in length (and/or other dimension) upon changing phase, for example, by being heated to a phase transition temperature.

The SMM wire 132 can include a SMA. In some arrangements, SMAs can be compositions which transition from a soft martensitic metallurgical state to a hard austenitic metallurgical state in response to heating above an austenitic transition temperature, $A_f$. The SMA can be processed while in a high-temperature austenitic phase to a desired configuration. The SMA can be cooled below a second transition temperature $M_f$ without change of physical dimensions to create a "memory" of the desired configuration (i.e., a memorized configuration), where $M_f$ is between the austenitic and martensitic states. Once the desired configuration is memorized, the SMA can be mechanically deformed into a first configuration while in the martensitic state. The SMA can remain in this first configuration or allow for other deformation until further heating to a temperature above $A_f$. Once above the $A_f$, the SMA can revert to the memorized configuration (which can also be referred to as the second configuration). During the transition from the first configuration to the second configuration, the SMA can exert large forces on adjacent members.

In some implementations, the SMM wire can comprise an SMA material with a high $A_f$ temperature, such as a $A_f$ temperature between about 90° C. and about 110° C. In further implementations, the input-responsive element 130 does not utilize the heating element 134, such as when employing a SMA which can be resistively heated using an electrical current. Example of the input-responsive element 130 can include Nickel-Titanium (Ni—Ti), which has resistivity allowing it to be heated directly with an electrical current.

Conversely, when increasing in temperature, the SMA can transition from a predominantly martensitic state to a predominantly austenitic state. The transition in states can result in the SMA changing from the first configuration to the second configuration, or vice versa. In some implementations, SMAs which can be used with one or more implementations described herein can include Ni—Ti, Ni—Ti-Niobium (Nb) alloys, Ni—Ti-Iron (Fe) alloys, Ni—Ti-copper (Cu) alloys, Ti-Palladium (Pd) alloys, Ti—Pd—Ni alloys, Ni—Ti—Cu alloys, Ti—Nb-Aluminum (Al) alloys, Hf—Ti—Ni alloys, Ti—Nb, Ni—Zr—Ti alloys, beta-phase titanium and combinations thereof. In some implementations, the first configuration can be maintained by the SMM wire 132 (e.g., a static first configuration). In implementations having a static first configuration, the SMM wire 132 can be referred to as having a two way shape-memory effect. Two way shape-memory effect (TMSME) refers to a SMA which has a specific memorized shape in both the martensitic state and in the austenitic state. In further implementations, the first configuration relates to the resting state of the actuator(s) 100 as interacting with the SMM wire 132. In these implementations, the first configuration can be considered dynamic, as the first configuration is not programmed to the SMM wire 132. In further implementations, the SMM can be a SMP.

The input-responsive element 130 can be heated in any suitable manner, now known or later developed. For instance, SMA wires can be heated by the Joule effect by passing electrical current through the wires. In some implementations, the input-responsive element 130 can include the heating element 134. The heating element 134 can include one or more components configured to increase the temperature of the SMM wire 132, such as a resistive heating element. The heating element 134 can be in operative connection with the SMM wire 132. In some implementations, the heating element 134 can operatively connected with the SMM wire 132, such as can be positioned around the SMM wire 132. In further implementations, the heating element 134 can be aligned parallel with the SMM wire 132. Though depicted as covering and/or increasing the temperature of the entirety of the SMM wire 132, the heating element 134 can be positioned or configured to affect any portion of the SMM wire 132. The heating element 134 can further be in operative connection with a computing device (not shown). The heating element 134 can receive an input, such as an electrical input from the computing device. In response to the input, the heating element 134 can provide heat for the SMM wire 132 resulting in a transition from a first configuration to a second configuration as described above. In some instances, arrangements can provide for cooling of the SMA wires, if desired, to facilitate the return of the wires to the first configuration.

The input-responsive element 130 can be connected to the hinge assemblies 120 at the connection element 136. The connection element 136 can be an element of the hinge assemblies 120 and/or a location on the hinge assemblies 120 where the input-responsive element 130 has a contact with the hinge assemblies 120 such that the input-responsive element 130 can apply force to the hinge assemblies 120. The connection element 136 incorporates a broad range of connection types in connection devices. In some implementations, the connection element 136 is an element configured to receive the input-responsive element 130, such as a loop or a hole. For instance, an SMA wire can pass through an aperture defined in the hinge assembly 120 (such as in an aperture formed in one of the first attachment member 122 and the second attachment member 124, and/or in a space defined between the hinge joint 126 and a respective one of the first attachment member 122 and the second attachment member 124) and wrap around the hinge joint 126 and return through another aperture defined in the hinge assembly 120 (such as in an aperture formed in one of the first attachment member 122 and the second attachment member 124, and/or in a space defined between the hinge joint 126 and a respective one of the first attachment member 122 and the second attachment members 124). In further implementations, the connection element 136 is a location of permanent or semi-permanent attachment, such as the spot weld or a wraparound of the input-responsive element 130 at the hinge assemblies 120. In one or more implementations, the connection element 136 is configured to withstand the temperatures produced by the input-responsive element 130. One skilled in the art will understand the breadth of possible connection types which can be used for the connection element 136.

Figure 1C:
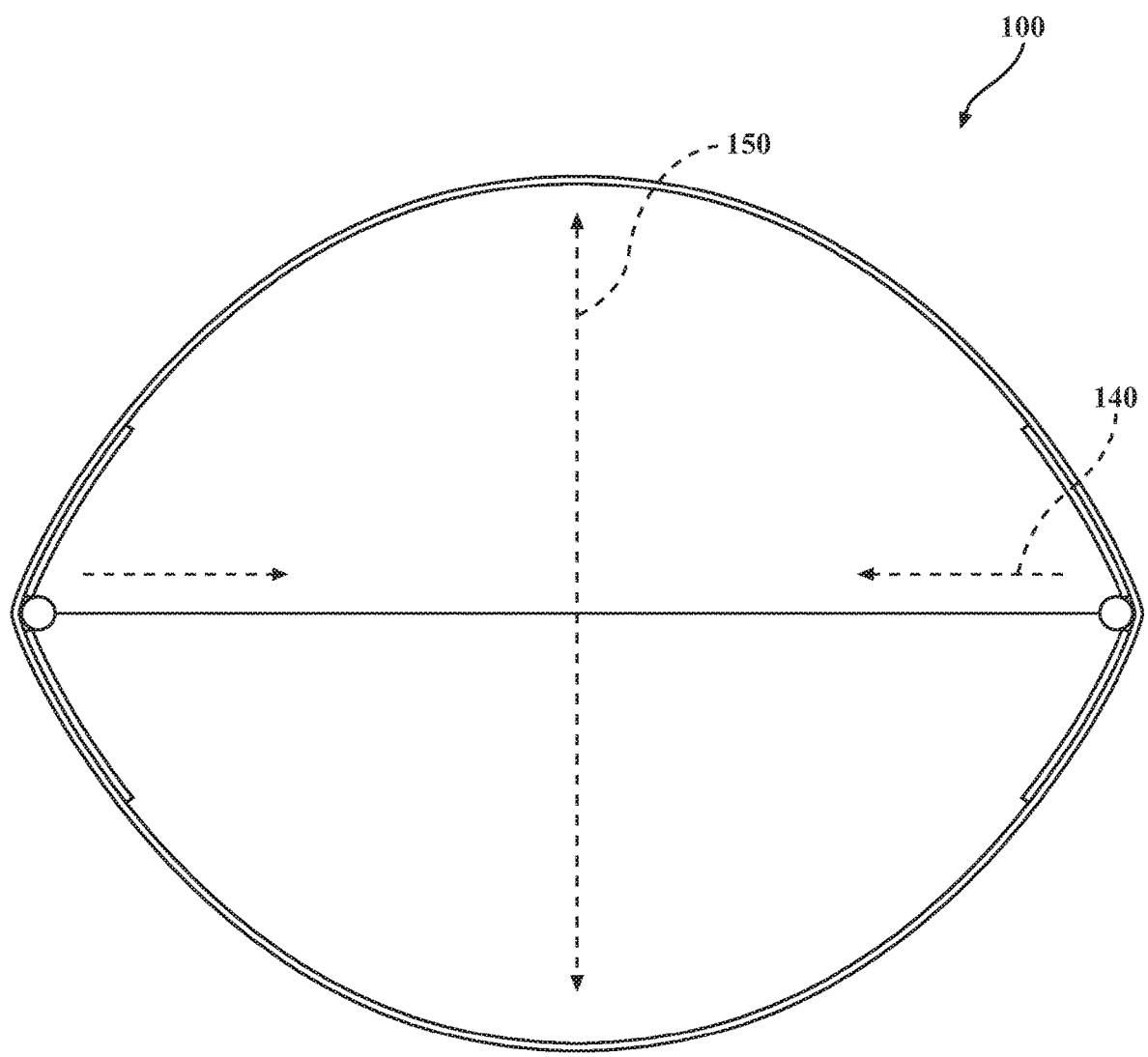
Figure 1D:
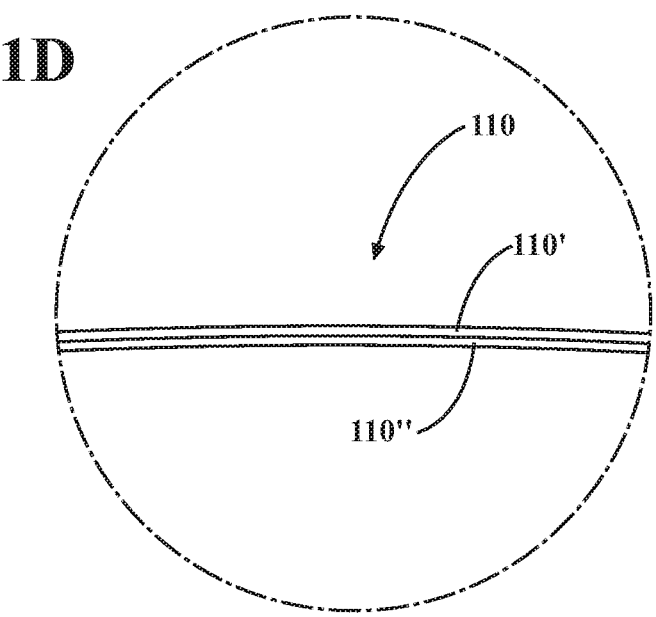

FIG. 1C is an illustration of the actuator(s) 100 in an activated configuration, according to some implementations. "Activated configuration," as used herein, relates to a state or position of the actuator when the input-responsive element 130, specifically the SMM wire 132, has received an input to cause it to transform. For instance, in the case of the SMM wire 132, the SMM wire can transition from the martensitic state (which allows for the passive configuration) to the austenitic state. The actuator 100 is depicted with the first dimension 140 and the second dimension 150. The first dimension 140 can include a direction along a plane that extends through the one or more hinge assemblies 120. In one or more implementations, the first dimension 140 can be substantially parallel and/or create a bisecting line through the hinge assemblies 120, through the interfacing region 118, or combinations thereof. The second dimension 150 is a direction along the plane, the plane and/or the direction being substantially perpendicular to the first dimension 140.

In operation, the SMM wire 132 increases in temperature in response to an input. In some implementations, the SMM wire 132 receives an electrical input, such as from a computing device and/or a power source. The computing device can be part of a system, such as an actuator control system. The SMM wire can heat up in response to the resistance of the wire to electrical input. In further implementations, the SMM wire is heated by a heating element 134. The heating element 134 can receive an input, causing the heating element 134 to produce heat and increasing the temperature of the SMM wire 132. The SMM wire 132, upon reaching a transition temperature $A_f$, changes from the first configuration to a second configuration. In this implementation, the SMM wire 132 in the second configuration can contract, thereby applying a force on each of the hinge assemblies 120. As a result, the hinge assemblies 120 are drawn toward each other in the direction of the first dimension 140.

As the hinge assemblies 120 move toward one another, the first attachment member 122 and the second attachment member 124 can pivot along the hinge joint 126. By pivoting, the first attachment member 122 and the second attachment member 124 can translate the force from the SMM wire 132 to the upper interior surface 114 and the lower interior surface 116, respectively. As such, changes in the size or shape of the outer skin 110 in the second dimension 150 can create an inverse change in size or shape of the outer skin 110 in the first dimension 140. The translated force through the hinge assemblies 120 creates a deformation in the outer skin 110. The deformation of the outer skin 110 causes the actuator(s) 100 to expand along the second dimension 150. The expansion of the actuator(s) 100 along the second dimension 150 results in the actuator(s) 100 having a decreased magnitude along the first dimension 140 and an increased magnitude along the second dimension 150.

In one or more further implementations, the actuator(s) 100 can change shape in any direction in response to an input. In some examples, the passive configuration can include a static position applying force in the second dimension 150. As such, the activated configuration can cause the actuator(s) 100 to expand along the first dimension 140. Thus, the activated configuration of the actuator(s) 100 can lead to decreased magnitude along the second dimension 150 in increased magnitude along the first dimension 140. It is further understood, that the first dimension 140 and the second dimension 150 are two exemplary possibilities of a variety of dimensions of the actuator(s) 100. Thus in one or more implementations, the first dimension 140 and the second dimension 150 as described herein can be any dimensions of the actuator(s) 100 and is not limited by the depicted dimensions of the first dimension 140 and the second dimension 150. Further, the first dimension 140 and the second dimension 150 appear to cross a central point of the actuator(s) 100. However, the point of intersection between the first dimension 140 and the second dimension 150 is not a necessary attribute of the actuator(s) 100 generally, the first dimension 140, and/or the second dimension 150.

When applied in conjunction with a vehicle seat, the actuator(s) 100 can change dimensions and reconfigure the seat surface to benefit the affected occupant. Through this change in shape, the actuator(s) 100 can help mitigate or dampen forces applied to the occupant while the vehicle is in transit, such as during tight terms or evasive maneuvers. By changing the seat surface, the actuator(s) 100 can help prevent the occupant from being displaced from the vehicle seat. Thus, the actuator(s) 100 can benefit an occupant of a vehicle both in safety and comfortability.

Figure 1E:
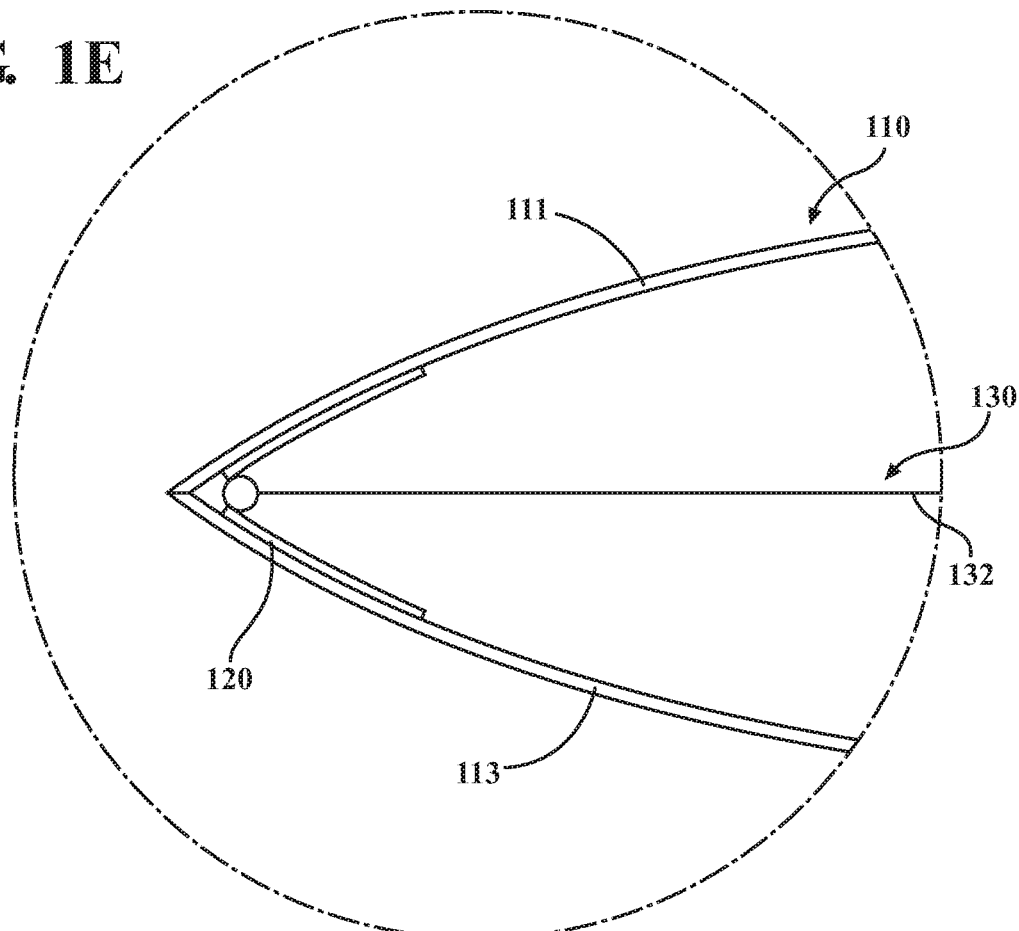

FIG. 1E shows an example in which the outer skin 110 includes a first outer skin 111 and a second outer skin 113. The first outer skin 111 can be operatively connected to a first hinge assembly 120 and a second hinge assembly 120 (shown on the right of the page in FIG. 1A) on a first side of the input-responsive element 130, which can be a shape memory material member (e.g., a SMM wire 132). The second outer skin 113 can be operatively connected to the first hinge assembly 120 and the second hinge assembly 120 on a second side of the input-responsive element 130.

Figure 2:
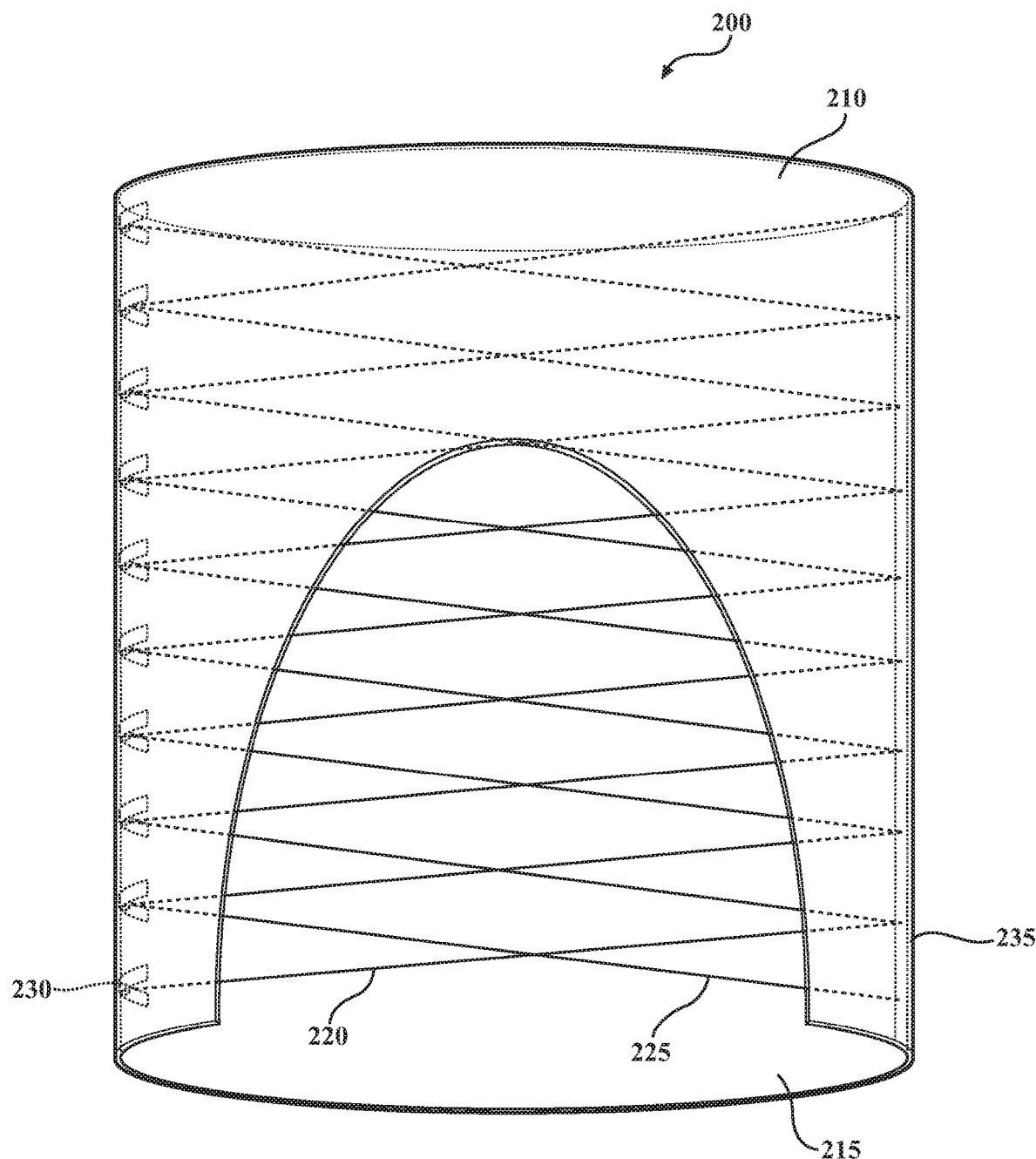
FIG. 2 is an illustration of the actuator, according to further implementations.

FIG. 2 depicts an isometric view of an actuator 200 with the cutaway segment, according to further implementations. The actuator 200 is shown with an outer skin 210, a cavity 215, a first input-responsive element 220, a second input-responsive element 225, a first hinge assemblies 230, and a second hinge assembly 235. The actuator 200 is depicted here with the outer skin 210 defining the cavity 215. The outer skin 210 can be substantially similar to the outer skin 110, described with reference to FIGS. 1A-1C. The outer skin 210 can be a combination of two sheets or layers, or it can be a single sheet or layer. The sheets or layers which compose the outer skin 210 can be substantially similar to one another, form different shapes or sizes, employ different materials, or combinations thereof. The cavity 215 is shown here as an opening formed in the center of the outer skin 210.

Though the cavity 215 is depicted as being open at the edges, the cavity 215 can be closed or sealed in one or more implementations.

Positioned within the cavity 215 is the first input-responsive element 220 and the second input-responsive element 225. In this alternative implementation, the first input-responsive element 220 and the second input-responsive element 225 are depicted as forming an alternating serpentine pattern. A "serpentine pattern" refers to the first input-responsive element 220 or the second input-responsive element 225 forming a zigzagging pattern alternating from one side to the other. Alternating serpentine pattern refers to the first input-responsive element 220 and the second input-responsive element 225 forming overlapping serpentine patterns which connects at alternating points within the cavity 215. It is understood that the first input-responsive element 220 and the second input-responsive element 225 as depicted here in the actuator 200 are non-limiting examples of a variety of possible formations and connections. The connections of the first input-responsive element 220 and/or the second input-responsive element 225 can include connecting to the first hinge assemblies 230 and/or the second hinge assembly 235. In some instances, the connections of the first input-responsive element 220 and/or the second input-responsive element 225 can include connecting to the outer skin 210.

The first input-responsive element 220 and the second input-responsive element 225 can be connected to the one or more first hinge assemblies 230 and/or the one or more second hinge assembly 235. The first hinge assemblies 230 can be a plurality of elements, depicted here as ten (10) elements, but it will be understood that any suitable number of hinge assemblies can be used. For instance, in one or more arrangements, there can be a single hinge assembly on each side of the actuator 200. The first hinge assemblies 230 can be operatively connected to the outer skin 210. In some implementation, the first hinge assemblies 230 can receive the first input-responsive element 220 and the second input-responsive element 225 in an alternating fashion. In this example, the first input-responsive element 220 can be received at the first, third, fifth, seventh, and ninth elements of the first hinge assemblies 230 (with respect to the bottommost first hinge assembly 230 shown in FIG. 2), and the second input-responsive element 225 can be received at the second, fourth, sixth, eighth, and tenth elements of the first hinge assemblies 230 (with respect to the bottommost first hinge assembly 230 shown in FIG. 2).

The second hinge assembly 235 is depicted here as a single continuous element. In further implementations, the second hinge assembly 235 can receive the first input-responsive element 220 and the second input-responsive element 225 and an alternating fashion along the same element. In this implementation, the first input-responsive element 220 and the second input-responsive element 225 alternate the points of connection rather than an alternating connection to specific elements, as depicted with reference to the first hinge assemblies 230. The first hinge assemblies 230 and the second hinge assembly 235 can employ a similar or different design of hinge assembly. The first hinge assemblies 230 and/or the second hinge assembly 235 can employ elements of or combinations of any components or elements of the hinge assemblies described herein. In one or more implementations, the first hinge assemblies 230 can be substantially similar to the second hinge assembly 235, including number of elements and configuration of the hinge assembly. The first hinge assemblies 230 and/or the second hinge assembly 235 can include more or fewer elements than depicted in FIG. 2. In one or more arrangements, the first hinge assembly 230 and the second hinge assembly 235 can both be a single continuous element (e.g., similar to the second hinge assembly 235 in FIG. 2). In one or more arrangements, both the first hinge assembly 230 and the second hinge assembly 235 can be made of a plurality of elements (e.g., similar to the first hinge assembly 230 in FIG. 2). In one or more arrangements, one of the first hinge assembly 230 and the second hinge assembly 235 can be made of a plurality of elements, and the other one of the first hinge assembly 230 and the second hinge assembly 235 can be a single continuous element, as is shown in FIG. 2.

Though depicted as a separate element from the outer skin 210, the first hinge assemblies 230 and/or the second hinge assembly 235 can be integrated into the outer skin 210. In further implementations, the outer skin 210 can be configured such that it performs the functions of the first hinge assemblies 230 and/or the second hinge assembly 235. In one such example, the outer skin 210 can be configured such that the interconnection between layers or the bend in a single layer translates of force applied by the first input-responsive element 220 and/or the second input-responsive element 225 changing the magnitude of the first dimension of the actuator 200 while inversely affecting the magnitude of the second dimension of the actuator 200.

Further, while FIG. 2 shows the first input-responsive element 220 and the second input-responsive element 225, it will be appreciated that there may only be one input-responsive element. The single input-responsive element can be arranged in a serpentine pattern. It will also be appreciated that the input-responsive element may not be directly attached to the hinge assemblies. For instance, the input-responsive element can pass through an aperture defined in the first hinge assemblies 230 and/or the second hinge assembly 235 and wrap around the hinge joint and return through another aperture defined in the first hinge assemblies 230 and/or the second hinge assembly 235.

Through the use of an alternating serpentine pattern, the actuator 200 can create a uniform actuation across the surface area of the actuator 200. In addition, the use of an alternating serpentine pattern can be used to achieve a desired actuation force and/or actuation time for the actuator 200. Further, the serpentine pattern allows the weight of the occupant to be equally distributed across the actuator, preventing localized stresses. As well, the alternating serpentine pattern can allow for more durable design and a decreased likelihood of failure at the point of attachment for the first input-responsive element 220 and the second input-responsive element 225. Thus the serpentine pattern allows for an increase in controllability of the overall actuation while minimizing the risk of device failure.

Figure 3:
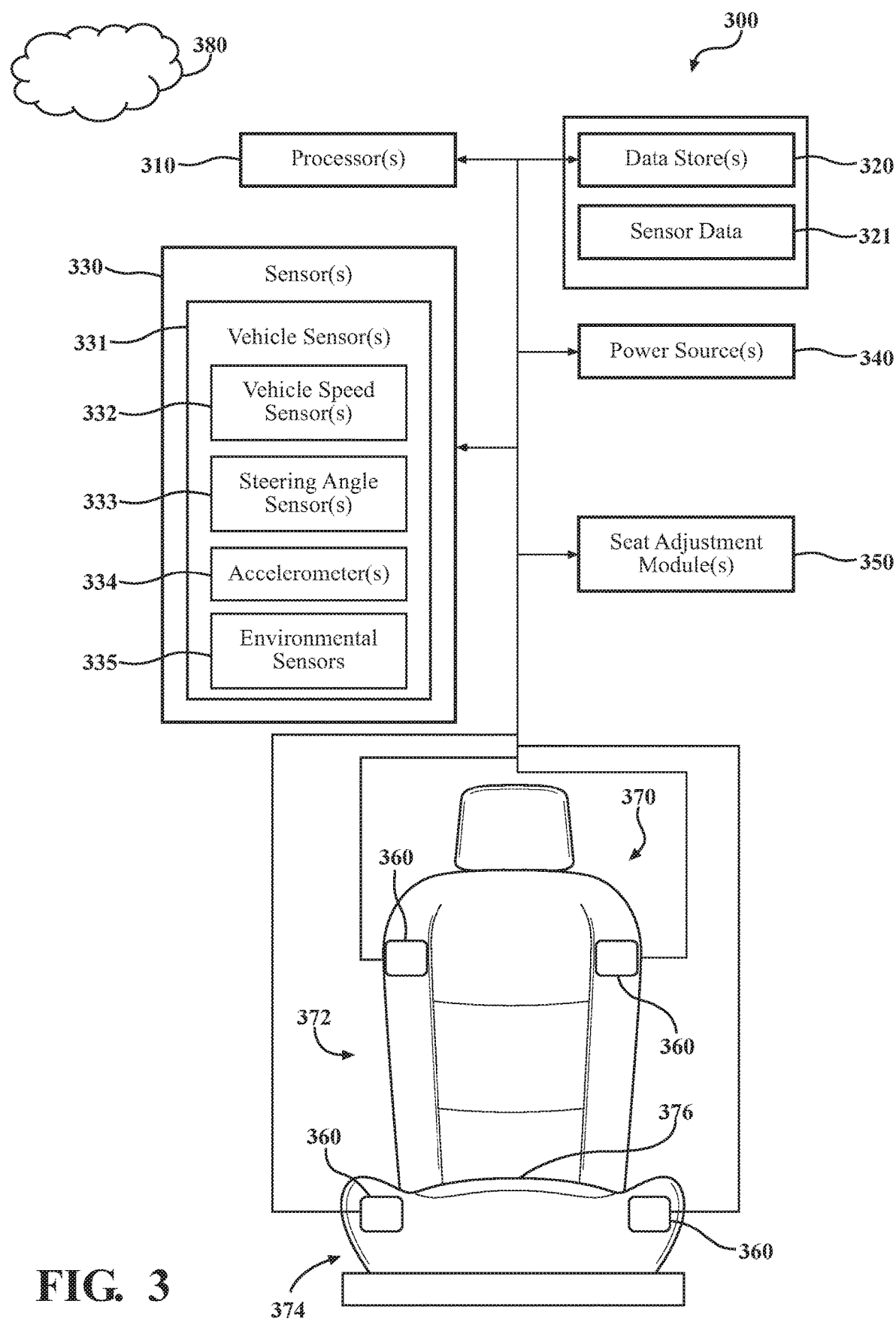
FIG. 3 is a block diagram of the actuator control system, according to some implementations.

FIG. 3 discloses one or more elements of the actuator control system 300, according to one or more implementations. The actuator control system 300 can be part of a vehicle and/or a computing device. The actuator control system 300, and components described herein, can function to adjust a seat in a vehicle in response to expected or actual movement of an occupant within the vehicle based on external stimulus. As used herein, the "vehicle" is any form of motorized transport. In one or more implementations, the vehicle can be an automobile. In some implementations, the vehicle may be any other form of motorized transport that, for example, can operate autonomously, semi-autonomously, or manually by an in-vehicle operator. The computing device can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit). In one or more implementations, the actuator control system 300 or components therein can be distributed among a plurality of devices to perform the functions described herein. As such, the actuator control system 300 is described herein with relation to components in a device-agnostic fashion.

The actuator control system 300 can detect conditions in which a vehicle occupant experiences or will experience lateral acceleration. In some instances, the actuator control system 300 can detect change in position or location of the vehicle which are sudden or drastic enough that the force applied to the occupant changes the occupant position with respect to the vehicle seat. Once detected, the actuator control system 300 can control the seat surface of the vehicle seat to prevent or stop the changes in the occupant position.

The actuator control system 300 can further include one or more processor(s) 310 for use in the data processing and analysis described herein. The processor(s) 310, which can also be referred to as a central processing unit (CPU), can be one or more devices which are capable of receiving and executing one or more instructions to perform a task as part of a computing device. In one implementation, the processor(s) 310 can include a microprocessor such as an application-specific instruction set processor (ASIP), a graphics processing unit (GPU), a physics processing unit (PPU), a DSP, an image processor, a co-processor, or others.

The actuator control system 300 can further comprise memory, such as data store(s) 320. The data store(s) 320 can include volatile and/or non-volatile memory. Examples of suitable data store(s) 320 include RAM, flash memory, ROM, EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 320 can be a component of the processor(s) 310, or the data store(s) 320 can be operably connected to the processor(s) 310 for use thereby. The data store(s) 320 can include one or more modules that include computer-readable instructions that, when executed by the processor 310, cause the processor 310 to perform methods and functions that are discussed herein. The data store(s) 320 can include one or more databases or portions thereof.

As noted above, the actuator control system 300 can include the sensor(s) 330. "Sensor" means any device, component and/or system that can detect, and/or sense something. The one or more sensors can be configured to detect, and/or sense in real-time. In arrangements in which the sensor(s) 330 includes a plurality of sensors, the sensors can function independently from each other. Alternatively, two or more of the sensors can work in combination with each other. In such a case, the two or more sensors can form a sensor network. The sensor(s) 330 and/or the one or more sensors can be operably connected to the processor(s) 310, the data store(s) 320, and/or another element of the actuator control system 300.

The sensor(s) 330 can include any suitable type of sensor. Various examples of different types of sensors will be described herein. However, it will be understood that the implementations are not limited to the particular sensors described. The sensor(s) 330 can include one or more vehicle sensor(s) 331. The vehicle sensor(s) 331 can detect, determine, and/or sense information about the actuator control system 300 itself. In one or more arrangements, the vehicle sensor(s) 331 can be configured to detect, and/or sense position and orientation changes of the actuator control system 300, such as, for example, based on inertial acceleration. In one or more arrangements, the vehicle sensor(s) 331 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 331 can be configured to detect, and/or sense one or more characteristics of the actuator control system 300 or the environment surrounding the actuator control system 300. In one or more arrangements, the vehicle sensor(s) 331 can include a vehicle speed sensor(s) 332 to determine a current speed of the actuator control system 300 (e.g., a speedometer), steering angle sensor(s) 333, one or more accelerometer(s) 334, or combinations thereof.

Alternatively, or in addition, the sensor(s) 330 can include one or more environment sensor(s) 335 configured to acquire, and/or sense driving environment data. "Driving environment data" includes any data or information about the external environment in which an autonomous vehicle is located or one or more portions thereof. For example, the one or more environment sensor(s) 335 can be configured to detect, quantify and/or sense objects in at least a portion of the external environment of the actuator control system 300, such as to determine position and changes therein. The one or more environment sensor(s) 335 can be configured to detect, measure, quantify and/or sense other things in the external environment of the actuator control system 300, such as, for example, lane markers, signs, traffic lights, traffic signs, lane lines, crosswalks, curbs proximate the actuator control system 300 or components thereof, off-road objects, etc. As an example, in one or more arrangements, the environment sensor(s) 335 can include one or more radar sensors, one or more LIDAR sensors, one or more sonar sensors, and/or one or more cameras.

Various examples of sensors of the sensor(s) 330 will be described herein. The example sensors may be part of the one or more environment sensor(s) 335 and/or the one or more vehicle sensor(s) 331. Moreover, the sensor(s) 330 can include occupant sensors that function to track or otherwise monitor aspects related to the an occupant of a vehicle. However, it will be understood that the implementations are not limited to the particular sensors described.

The one or more data store(s) 320 can include sensor data 321. In one or more implementations, the sensor data 321 can be collected from and/or produced by the sensor(s) 330. In this context, "sensor data" means any information about the sensors that the actuator control system 300 is equipped with, including the capabilities and other information about such sensors. As will be explained below, the actuator control system 300 can include the sensor(s) 330. The sensor data 321 can relate to one or more sensors of the sensor(s) 330.

The actuator control system 300 can include one or more power sources 340. The power source(s) 340 can be any power source capable of and/or configured to energize the seat actuator(s) described herein. For example, the power source(s) 340 can include one or more batteries, one or more fuel cells, one or more generators, one or more alternators, one or more solar cells, and combinations thereof.

The actuator control system 300 can further include the vehicle seat 370. The vehicle seat 370 is representative of one or more seats found in a vehicle. The vehicle seat 370 can include a seat back 372 and a seat cushion 374. The vehicle seat 370 can further include a seat surface 376. One or more actuators 360 can be positioned under the seat surface 376 shown here with two (2) actuators 360 positioned inside of the seat back 372 and two (2) actuators 360 positioned inside of the seat cushion 374. The actuators 360 positioned and oriented such that actuation of the actuators 360 can change the shape of the seat surface 376, as received by an occupant. Though total of four (4) actuators 360 are shown integrated into the vehicle seat 370, it is understood that more or fewer actuators 360 can be used for one or more implementations described herein. The actuators 360 can be substantially similar to and/or incorporate components of the actuator(s) 100 and/or the actuator 200, described with reference to FIGS. 1A-2.

The actuator control system 300 can further include the seat adjustment module(s) 350. The seat adjustment module(s) 350 can include one or more modules capable of and/or configured to adjust the vehicle seat, according to one or more implementations described herein. The seat adjustment module(s) 350 can include instructions that function to control the processor(s) 310 to receive the sensor data 321 from the one or more sensor(s) 330 of the vehicle. In one or more implementations, the seat adjustment module(s) 350 can receive the sensor data 321 from the sensor(s) 330 in a passive fashion (e.g., receiving sensor data without specific request or control) or an active fashion (e.g., receiving sensor data in response to one or more inputs). In some implementations, the seat adjustment module(s) 350 through instructions to the processor(s) 310 requests one or more components of the sensor data 321 from the sensor(s) 330. In further implementations, the seat adjustment module(s) 350 through instructions to the processor(s) 310, receive some or all of the sensor data 321 as produced by the sensor(s) 330.

In some implementations, the seat adjustment module(s) 350 can further include instructions to collect data or receive data selectively based on sensor type. The seat adjustment module(s) 350 can, through instructions to the processor(s) 310, selectively receive or collect sensor data 321 from one or more components of the sensor(s) 330, such as from sensors that are specifically on the vehicle (e.g., the vehicle sensor(s) 331). It is understood that information about momentum, velocity, acceleration, and other facets of vehicle movement can be used beneficially to determine the effects of vehicle movement on an occupant. As such, the seat adjustment module(s) 350 can request information or receive information from the vehicle speed sensor(s) 332, the steering angle sensor(s) 333, the accelerometer(s) 334, or combinations thereof. The seat adjustment module(s) 350 can further reference information against the environmental sensor(s) 335, such that the seat adjustment module(s) 350 can make a spatial determination of vehicle location, movement, acceleration, traction, and other aspects of vehicle interaction in a three-dimensional space.

In further implementations, the seat adjustment module(s) 350 can further include instructions to incorporate sensor data from one or more remote sources. The seat adjustment module(s) 350 can include instructions to receive or gather data from locally available sensor(s) 330 (e.g., the vehicle sensor(s) 331), such as sensor(s) 330 available to one or more computing devices, as well as internally directed vehicle sensor(s) 331 and externally directed vehicle sensor(s) 331. The seat adjustment module(s) 350 can receive the sensor data 321 from the sensor(s) 330 through a network 380. The network 380 can include any type of electronic device communications, including a local area network (LAN) or a wide area network (WAN), a controller area network (CAN) bus, mesh network, ad-hoc networks, or any other connection involving a second or a remote computing device (for example, through the Internet using an Internet Service Provider).

The sensor(s) 330 can be sensors connected to or otherwise available from external sources, such as other vehicles, infrastructure, nontraditional sensors, or others which can be used to make determinations about vehicle movements and the effects on occupants within the vehicle. Vehicle sensor(s) 331 which are internally directed can include image capture devices (e.g., cameras), audio capture devices (e.g., microphones), pressure or weight sensors, and others that capture information from or about the cabin of the vehicle. Once the sensor data 321 is received, the seat adjustment module(s) 350 can provide instructions to store the sensor data 321 in the data store(s) 320.

The seat adjustment module(s) 350 can further include instructions that function to control of the processor(s) 310 to determine, using the sensor data, whether an actuator activation threshold is met. The actuator activation threshold, as used herein, relates one or more minimum or maximum data points which indicate that the activation of one or more of the actuators 360 is appropriate. The seat adjustment module(s) 350 can include instructions to make a determination of the actuator activation threshold for one or more occupants. The actuator activation threshold can include a specific level of acceleration or a specific change in acceleration, the directionality of the acceleration, the force applied in braking (e.g., deceleration), or other factors which can affect or have an impact on occupant position within the vehicle. In one or more implementations, the actuator activation threshold can be a range of numbers, where the range can set of lower boundary, an upper boundary, or both.

In some implementations, the seat adjustment module(s) 350 can select an actuator activation threshold based on one or more pre-established values. In this implementation, the seat adjustment module(s) 350 can reference the data store(s) 320, through instructions to the processor(s) 310, and select from one or more values that are stored therein. In further implementations, the seat adjustment module(s) 350 can include instructions to calculate or otherwise determine the actuator activation threshold. The seat adjustment module(s) 350 can include instructions to collect threshold information, including ambient environmental conditions, vehicle conditions, and/or characteristics about the occupants. The seat adjustment module(s) 350 can, through instructions to the processor(s) 310, prepare or create one or more actuator activation thresholds using the threshold information.

Further, the actuator activation threshold can take into account personal characteristics of the occupant, such as age, height, weight, infirmity, or other factors individual to the occupant. The seat adjustment module(s) 350 can include instructions to request or determined personal characteristics of the occupant. The seat adjustment module(s) 350 can, through instructions to the processor(s) 310, select a pre-established or calculated range based on the personal characteristics. In further implementations, the seat adjustment module(s) 350 can include instructions to the processor(s) 310 two incorporate personal characteristics of the occupant in the threshold information described above. The seat adjustment module(s) 350, through the processor(s) 310, can prepare or create one or more actuator activation thresholds using the threshold information including the personal characteristics.

The seat adjustment module(s) 350 can include instructions to apply the actuator activation thresholds to the sensor data 321 to determine if the threshold has been met. In some implementations, the seat adjustment module(s) 350 compares given values or data points to the actuator activation threshold to determine if the threshold has been met. In further implementations, the seat adjustment module(s) 350, through instructions to the processor(s) 310, calculates or processes the given values data points to determine if the actuator activation threshold has been met. Here the seat adjustment module(s) 350, after receiving the sensor data 321, can transform these data points based on characteristics of the data, such as a Fourier transform, integrals, derivations, associations with physical properties, or others.

The seat adjustment module(s) 350 can further include instructions to control processor(s) 310 to cause an activation input to be provided to the SMM wire of at least one of the one or more actuators to morph the seat surface in response to determining that the actuator activation threshold is met. The activation input can be a direct input, such as delivering heat or electrical input directly to the SMM wire, or an indirect input. Indirect input, as used herein, relates to input which is delivered to the SMM wire by a secondary mechanism, such as by delivering instructions to a secondary device, wherein the secondary device delivers heat or electrical input to the SMM wire. The vehicle can include one or more power sources. The power source(s) can be any power source capable of and/or configured to energize the SMM wire. For example, the power source(s) can include one or more batteries, one or more fuel cells, one or more generators, one or more alternators, one or more solar cells, and combinations thereof.

In further implementations, the seat adjustment module(s) 350 can further include instructions to calculate or otherwise determine an appropriate response based on the data points. The seat adjustment module(s) 350 can, through instructions to the processor(s) 310, determine one or more parameters of the forces applied on the occupant by the vehicle, including lateral forces, gravitational forces, and others which may affect occupant displacement. The seat adjustment module(s) 350 can select one or more of the actuators 360 to activate such that the occupant displacement is mitigated, in whole or in part. The actuators 360 can be actuated as described above with reference to FIGS. 1A-2, creating a displacement at one or more locations in the seat surface 376. The change in shape of the seat surface 376 can create a physical barrier or another form of resistance (e.g., friction) to the occupant displacement.

The seat adjustment module(s) 350 can thus use the changes in position and location of the vehicle to determine the effects on the displacement of the occupant. Using the anticipated or detected occupant displacement, the seat adjustment module(s) 350 can respond by actuating one or more actuators to change the shape of the seat surface, such as the seat bolsters. The change in shape can be specifically selected to prevent the occupant displacement. Thus, the seat adjustment module(s) 350 can reduce or prevent occupant displacement in the vehicle, creating a more comfortable commute for the occupant, reducing the likelihood of injury and helping the operator maintain control of the vehicle during difficult driving conditions.

Figure 4A:
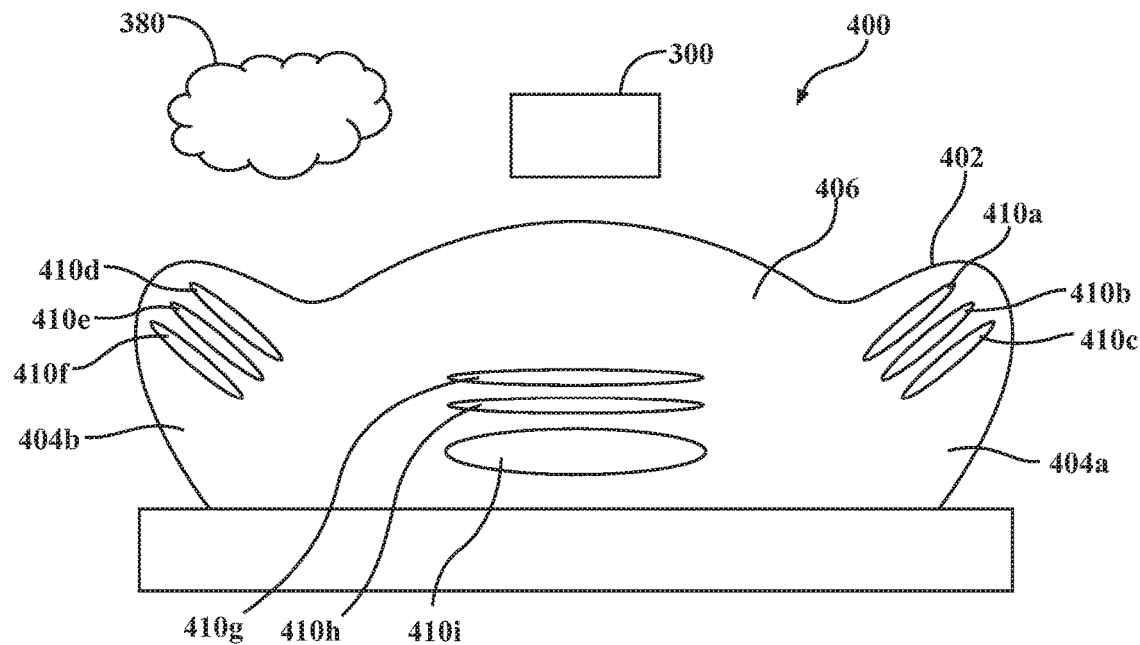
FIGS. 4A and 4B are illustrations of one or more actuators as part of the seat assembly for vehicle, according to some implementations.
Figure 4B:
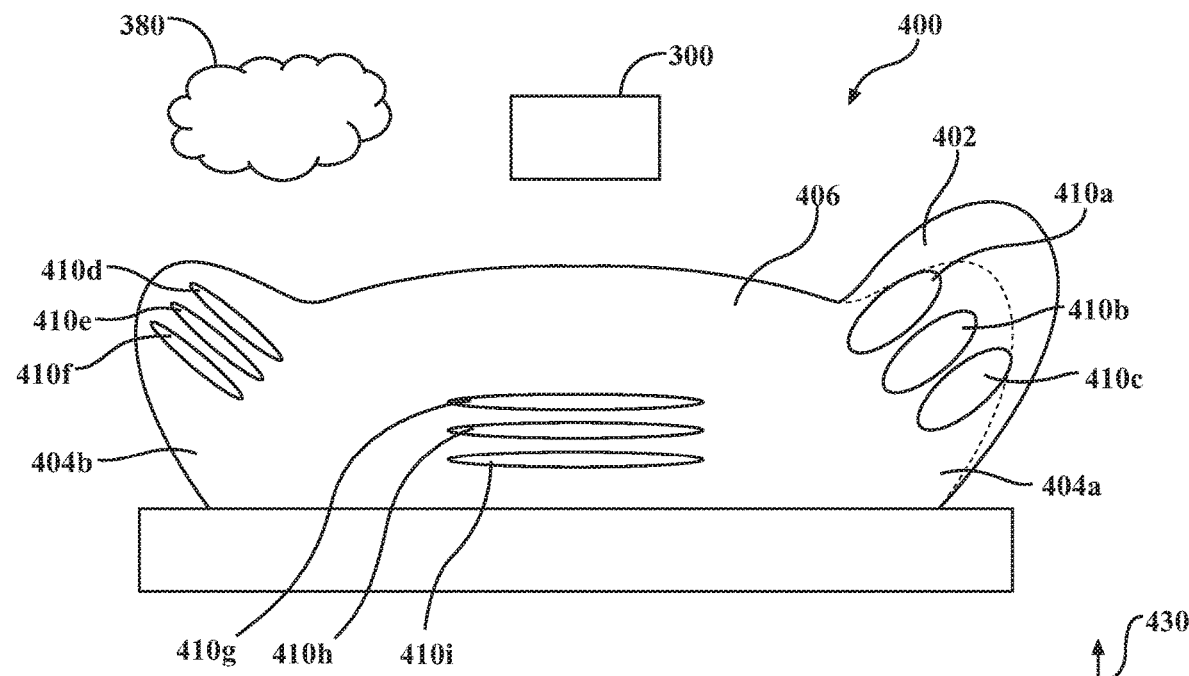

FIGS. 4A and 4B depict a portion of a responsive vehicle seat 400 for use in a vehicle, according to one or more implementations described herein. FIG. 4A depicts the vehicle seat 400 in a passive configuration, according to one or more implementations. The vehicle seat 400 can include a seat surface 402 having a seat bolster 404a, a seat bolster 404b, and a seat center 406. The vehicle seat 400 can further include one or more actuator(s) 410, such as a actuator(s) 410a-410i positioned within the vehicle seat 400 under a seat surface 402. The vehicle seat 400 can actuate one or more of the actuator(s) 410a-410i to change the shape and/or the configuration of the seat surface 402, as disclosed herein.

The vehicle seat 400 is depicted here showing the lower portion of the seat, including the seat center 406 and the seat bolster 404a and 404b. The one or more actuators 410 or positioned in one or more locations in the vehicle seat 400, shown here with the actuator(s) 410a-410c positioned within the seat bolster 404a, the actuator(s) 410d-410f positioned within the seat bolster 404b, and the actuator(s) 410g-410i positioned within the seat center 406. The actuator(s) 410a-410i can be substantially similar to the input-responsive element 130, described with reference to FIG. 1A-1C.

In one example of the system in operation, the actuator control system 300 can detect, predict, or otherwise determine that a lateral acceleration is currently being applied or will be applied to one or more occupants in the vehicle. The actuator control system 300 can send one or more inputs to the actuator(s) 410a-410i to change the seat surface 402 such that the shift of the occupant in response to the lateral acceleration is mitigated. The actuator control system 300 can determine which of the actuator(s) 410a-410i should be actuated in response to the lateral acceleration as detected by the actuator control system 300. In one or more implementations, the actuator control system 300 can be operatively connected with the vehicle seat 400 through the network 380, such as being in direct or indirect communication with the vehicle seat 400. As such, the actuator control system 300 can directly or indirectly send an input to the actuator(s) 410a-410i to control transition between the passive and activated configurations as described above.

The actuation of some of the actuator(s) 410a-410i within the vehicle seat 400 is depicted in FIG. 4B. The actuator control system 300 can transmit a signal to the actuator(s) 410a, 410b, and 410c to transition from the passive configuration to the activated configuration. In one or more implementations, the actuator(s) 410a, 410b, and 410c can actuate a seat bolster, a seat center, a seat back, or other surfaces or features of a vehicle seat. Each of the actuator(s) 410a, 410b, 410c, directly or indirectly receive an input, such as thermal or electrical input, which causes the SMM wire to reverting to a first configuration. The first shape applies a force to the first dimension of the actuator(s) 410a, 410b, 410c, which causes a decrease in the first dimension 420 and an increase in the second dimension 430.

The respective decreases and increases are translated to the seat surface 402 of the seat bolster 404a to create resistance to the lateral acceleration, thus allowing the occupant to remain in the vehicle seat. As shown here, the seat bolster 404a expands in the second dimension 430 in response to the actuator(s) 410a-410c expanding in the second dimension 430. In this example, the lateral acceleration from the perspective of the occupant can be detected as moving in the direction of the seat bolster 404a. By changing the shape of the seat bolster 404a, the actuator control system 300 to create a physical barrier to the lateral shift of the occupant in the vehicle seat 400.

In some instances, there can be actuators positioned relative to other portions of the vehicle seat 400, such as in the seat center 406, to further the support provided. For instance, actuators in the seat center 406 can be configured to contract in the second dimension 430 in response to receiving an input. As a result, the seat center 406 can contract in the second dimension 430 in response to the actuator(s) 410i contracting in the second dimension 430. As a result, the barrier imposed by the enlarged seat bolster 404a can become more pronounced.

Now that the various potential systems, devices, elements and/or components have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
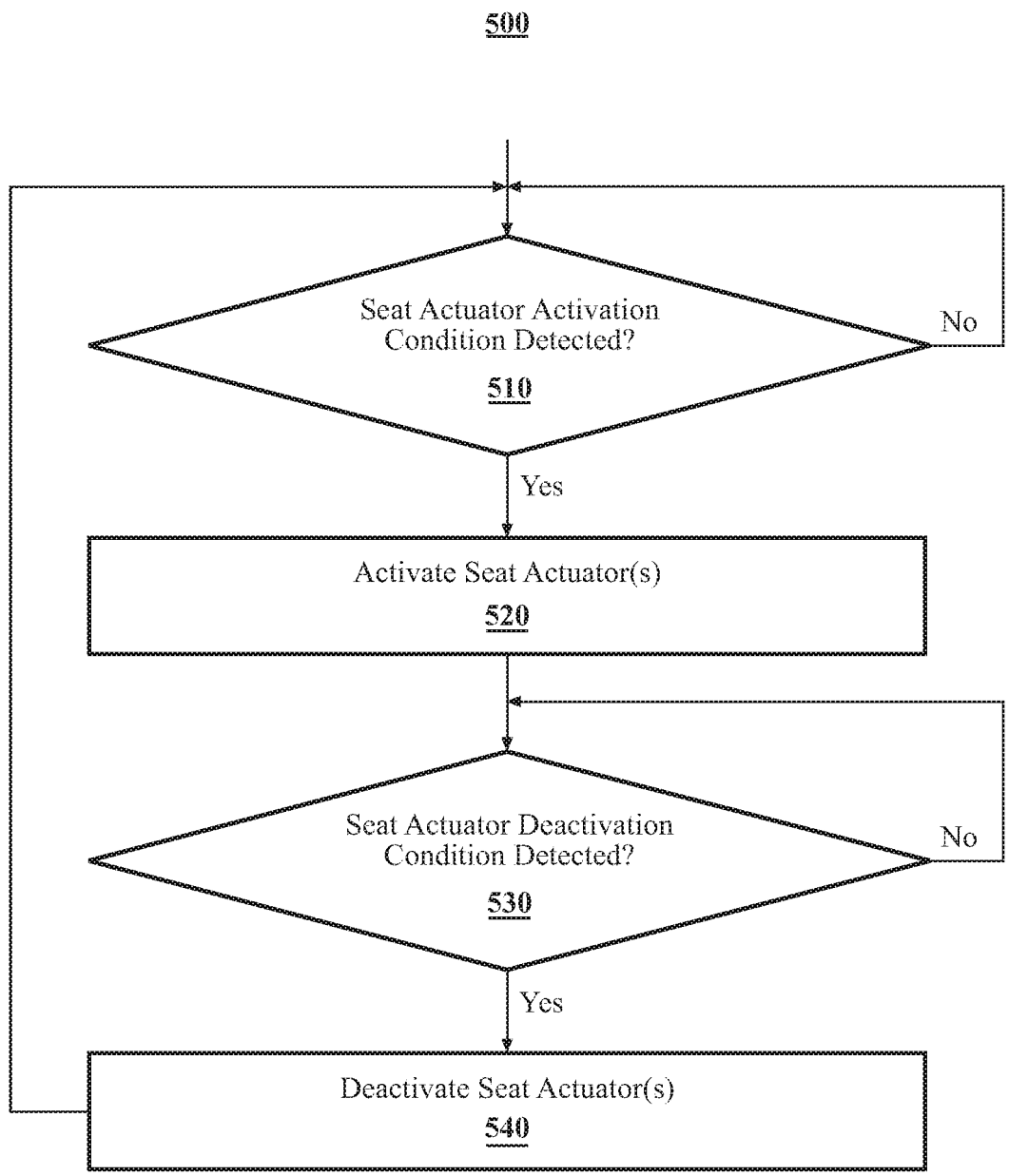
FIG. 5 is an example of a method of selectively morphing a portion of a vehicle seat.

Turning to FIG. 5, an example of a method 500 is shown. For the sake of discussion, the method 500 can begin with the actuator(s) 100 in a non-activated mode, such as is shown in FIG. 1A. In the non-activated mode, electrical energy from the power source(s) 340 is not supplied to the actuator(s) 100. At block 510, it can be determined whether a seat activation condition has been detected. The seat activation condition may be detected by the seat adjustment module(s) 350, the processor(s) 310, and/or one or more sensor(s) 330. For instance, the seat adjustment module(s) 350, the processor(s) 310, and/or one or more sensor(s) 330 can determine that data acquired by the vehicle sensor(s) 331 meets a seat activation condition.

In some implementations, the seat adjustment module(s) 350, the processor(s) 310, and/or one or more sensor(s) 330 can determine whether the current vehicle speed and/or the current steering angle meet respective seat activation threshold. In one or more arrangements, the vehicle speed threshold can be about 30 miles per hour (mph), 35 mph, 40 mph, 45 mph, 50 mph, 55 mph, 60 mph, 65 mph, 70 mph, or even greater, just to name a few possibilities. In one or more arrangements, the steering angle threshold can be about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, or about 90 degrees, just to name a few possibilities. Alternatively or additionally, the seat adjustment module(s) 350, the processor(s) 310, and/or one or more sensor(s) 330 can determine whether the current lateral acceleration meets respective seat activation threshold. Alternatively or in addition, the seat adjustment module(s) 350, the processor(s) 310, and/or one or more sensor(s) 330 can detect a user input indicating that the interface should be activated. The user input can be provided via an input interface.

If a seat activation condition is not detected, the method 500 can end, return to block 510, or proceed to some other block. However, if a seat activation condition is detected, then the method can proceed to block 520. At block 520, the actuator(s) 100 can be activated. Of course, the seat adjustment module(s) 350 and/or the processor(s) 310 may only actuate certain individual actuator(s) 100 while leaving others in a non-activated state. Thus, the seat adjustment module(s) 350 and/or the processor(s) 310 can cause or allow the flow of electrical energy from the power sources(s) 340 to the actuator(s) 100. Current flowing through the input-responsive element 130 can cause the input-responsive element 130 to heat up which causes them to change, which, consequently, causes the actuator(s) 100 to morph into an activated configuration.

When activated, the actuator(s) 100 can morph to an activated shape, such as is shown in FIG. 4A. The actuator(s) 100 can interact with portions of the vehicle seat 370 to cause a portion of the vehicle seat 370 to morph into an activated configuration, such as is shown in FIG. 4B. The method can continue to block 530.

At block 530, it can be determined whether a seat deactivation condition has been detected. The seat deactivation condition may be detected by the seat adjustment module(s) 350, such as based on data acquired by the sensor(s) 330 and/or by detecting a user input or the cessation of a user input. If a seat deactivation condition is not detected, the method 500 can return to block 530, or proceed to some other block. However, if a deactivation condition is detected, then the method can proceed to block 540. At block 540, the actuator(s) 100 can be deactivated. Thus, the seat adjustment module(s) 350 and/or the processor(s) 310 can cause the flow of electrical energy from the power sources(s) 340 to the actuator(s) 100 to be discontinued.

The method 500 can end. Alternatively, the method 500 can return to block 510 or some other block.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the preceding. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the preceding. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the arrangements described herein may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. An actuator comprising:
a first hinge assembly;
a second hinge assembly;
an outer skin operatively connected to the first hinge assembly and the second hinge assembly, the outer skin comprising one or more material layers, the outer skin defining a cavity; and
one or more shape-memory material (SMM) members operatively connected to the first hinge assembly and the second hinge assembly, the one or more SMM members being located substantially within the cavity,
the actuator having a first dimension and a second dimension, the first dimension being substantially perpendicular to the second dimension, the first dimension being in a direction that extends through the first hinge assembly and the second hinge assembly, the actuator being configured such that, when an activation input is provided to the one or more SMM members, the one or more SMM members change from a first configuration to a second configuration and cause the actuator to morph into an activated configuration in which the first dimension increases or decreases and the second dimension changes inversely to the first dimension.

2. The actuator of claim 1, wherein the outer skin includes a first outer skin and a second outer skin, wherein the first outer skin is operatively connected to the first hinge assembly and the second hinge assembly on a first side of the SMM members, and wherein the second outer skin is operatively connected to the first hinge assembly and the second hinge assembly on a second side of the one or more SMM members.

3. The actuator of claim 1, wherein at least one of the one or more SMM members is a shape-memory alloy (SMA) wire.

4. The actuator of claim 1, wherein the one or more SMM members includes a first SMM wire and a second SMM wire, the first SMM wire being arranged in a first serpentine pattern and the second SMM wire being arranged in a second serpentine pattern, the second serpentine pattern being different from the first serpentine pattern.

5. The actuator of claim 1, wherein the one or more SMM members includes a single SMM wire arranged in a serpentine pattern between the first hinge assembly and the second hinge assembly.

6. The actuator of claim 1, wherein the actuator is further configured such that, when the activation input to the one or more SMM members is discontinued, the one or more SMM members substantially return to a passive configuration.

7. The actuator of claim 1, wherein each of the first hinge assembly and the second hinge assembly comprises a first attachment member and a second attachment member connected by a hinge joint, the first attachment member rotating with relation to the second attachment member about the hinge joint.

8. A system for active vehicle seat adjustment, comprising:
a vehicle seat, the vehicle seat including a seat surface;
one or more actuators located within a portion of the vehicle seat, the one or more actuators being operatively positioned relative to the seat surface such that, when activated, the one or more actuators cause the seat surface to morph into an activated configuration, each of the actuators having:
a first hinge assembly;
a second hinge assembly;
an outer skin operatively connected to the first hinge assembly and the second hinge assembly, the outer skin comprising one or more material layers, the outer skin defining a cavity; and
a shape-memory material (SMM) member operatively connected to the first hinge assembly and the second hinge assembly, the SMM member being located substantially within the cavity,
the actuator having a first dimension and a second dimension, the first dimension being substantially perpendicular to the second dimension, the first dimension being in a direction that extends through the first hinge assembly and the second hinge assembly, the actuator being configured such that, when an activation input is provided to the SMM member, the SMM member changes from a first configuration to a second configuration and causes the actuator to morph into an activated configuration in which the first dimension changes inversely to the second dimension.

9. The system of claim 8, further including:
one or more processors operatively connected to the one or more actuators; and
a memory communicably coupled to the one or more processors and storing instructions that when executed by the one or more processors cause the one or more processors to:
receive sensor data from one or more sensors on a vehicle;
determine, using the sensor data, whether an actuator activation threshold is met; and
responsive to determining that the actuator activation threshold is met, causing an activation input to be provided to the SMM member of at least one of the one or more actuators, the at least one of the one or more actuators morphing the seat surface in response to the activation input.

10. The system of claim 8, wherein the SMM member comprises a shape-memory alloy.

11. The system of claim 8, wherein at least one of the one or more actuators is configured to actuate a seat back, a bolster of a seat back, a seat cushion, or a bolster of a seat cushion of the vehicle seat.

12. The system of claim 9, wherein the sensor data used to determine whether an actuator threshold has been met includes vehicle speed or steering wheel angle.

13. The system of claim 9, wherein the sensor data used to determine whether an actuator threshold has been met includes lateral acceleration.

14. The system of claim 8, wherein the SMM member is arranged in a serpentine manner between the first hinge assembly and the second hinge assembly.

15. The system of claim 14, wherein the SMM member is a first SMM member, and further including a second SMM member, and wherein the second SMM member is arranged in a serpentine manner between the first hinge assembly and the second hinge assembly, and wherein the first and second SMM members are arranged in an alternating manner.

16. The system of claim 8, wherein the one or more actuators are further configured such that, when the activation input to the SMM member is discontinued, the SMM member substantially returns to a passive configuration.

17. A method of morphing a portion of a vehicle seat, one or more actuators being located within the vehicle seat, the one or more actuators being operatively positioned such that, when activated, the one or more actuators cause the portion of the vehicle seat to morph into an activated configuration, the method comprising:
  receiving sensor data from one or more sensors on a vehicle;
  determining, based on the sensor data, whether a seat actuator activation condition is met; and
  responsive to determining that the seat actuator activation condition is met, causing one or more actuators to be activated to cause the portion of the vehicle seat to morph into the activated configuration, the one or more actuators including:
    a first hinge assembly;
    a second hinge assembly;
    an outer skin operatively connected to the first hinge assembly and the second hinge assembly, the outer skin comprising one or more material layers, the outer skin defining a cavity; and
    a shape-memory material (SMM) member operatively connected to the first hinge assembly and the second hinge assembly, the SMM member being located substantially within the cavity.

18. The method of claim 17, wherein the portion of the vehicle seat is a seat cushion, a bolster of a seat cushion, a seat back, or a bolster of a seat back.

19. The method of claim 17, wherein determining, based on the sensor data, whether the seat actuator activation condition is met includes:
  comparing the sensor data to one or more thresholds, wherein the one or more thresholds includes a vehicle speed threshold, a steering angle threshold, or a lateral acceleration threshold; and
  if the sensor data meets the one or more thresholds, then a seat actuator activation condition is determined to be met.

20. The method of claim 17, wherein the SMM member comprises a shape-memory alloy wire.

* * * * *